(12) United States Patent
Sherrets et al.

(10) Patent No.: US 8,380,801 B2
(45) Date of Patent: Feb. 19, 2013

(54) SYSTEM FOR TARGETING THIRD PARTY CONTENT TO USERS BASED ON SOCIAL NETWORKS

(76) Inventors: Doug Sherrets, San Francisco, CA (US); Alexander Mittal, Berkeley, CA (US)

( * ) Notice: Subject to any disclaimer, the term of this patent is extended or adjusted under 35 U.S.C. 154(b) by 0 days.

(21) Appl. No.: 13/103,529

(22) Filed: May 9, 2011

(65) Prior Publication Data

US 2011/0213762 A1 Sep. 1, 2011

Related U.S. Application Data

(63) Continuation of application No. 12/116,687, filed on May 7, 2008, now Pat. No. 7,941,535.

(51) Int. Cl.
*G06F 13/00* (2006.01)

(52) U.S. Cl. .................... 709/206; 709/219; 709/224

(58) Field of Classification Search .................. 709/204, 709/205, 206, 213, 217, 219, 223, 225, 250
See application file for complete search history.

(56) References Cited

U.S. PATENT DOCUMENTS

| | | | |
|---|---|---|---|
| 7,665,107 B2 | 2/2010 | Goodman et al. | |
| 2008/0133649 A1* | 6/2008 | Pennington et al. | 709/203 |
| 2008/0228776 A1 | 9/2008 | Weiss et al. | |
| 2009/0144392 A1* | 6/2009 | Wang et al. | 709/217 |
| 2009/0172127 A1 | 7/2009 | Srikanth et al. | |
| 2009/0201896 A1* | 8/2009 | Davis et al. | 370/338 |

\* cited by examiner

*Primary Examiner* — Viet Vu
(74) *Attorney, Agent, or Firm* — Advent IP, P.C., L.L.O.

(57) ABSTRACT

A method and system of providing Internet content to a user utilizing social networks is disclosed. The method comprises providing Internet usage data for a plurality of users, determining which users belong to the same social network, and providing at least one of the users access to Internet usage data for those other users who are in the same social network.

53 Claims, 3 Drawing Sheets

100

| chillaxn | Search 142,071 items  Browse Videos | Hello, Doug! | Home | My Profile | My Friends | Groups | Find Friends | Help | Logout |

106

| All Content | Videos | Articles & Blogs | Photos | Music | Shopping |
|---|---|---|---|---|---|
| See what other people are checking out | >My Friends 231 people | My friends and Friends' Friends 15,021 people | | Everyone | |

| My Friends | Alex last Starred 31 minutes ago | Greg last commented 1 hour ago | An last posted 2 hours ago | Liz last starred 4 hours ago | Eric last purchased 5 hours ago | ...and 236 others |

Pages: 1 2 3 4 5 6 7 8 9 10 [Next] [Last]       108

---

Recently Checked Out

Video YouTube – Demonstration of a new racing vehicle
2 comments, 4 stars, 3 posts, 15 views
Last checked out by a friend 5 seconds ago Shopping Amazon.com – Brand new camera by Sony on sale
5 comments, 7 stars, 4 purchases, 21 views
Last checked out by a friend 15 seconds ago Photo Flickr – Photo of Laura and Matt visiting the river
2 comments, 4 stars, 1 post, 11 views
Last checked out by a friend 1 minute ago Article WSJ – Auto company investigates adding new technology to cars
21 comments, 11 stars, 5 posts, 71 views
Last checked out by a friend 1 minute ago

102

---

Recently commented, starred, or posted

Shopping Overstock.com – New music player technology
9 comments, 12 stars, 9 posts, 455 views
Last commented on and starred by Doug 5 seconds ago
"Wow, now you can put even more songs on the music player. Cool!"

Photo Picasa – View of mountain in Colorado
22 comments, 15 stars, 2 posts, 45 views
Last commented on by Eric 2 minutes ago
"That's an incredible view! It's amazing how much snow fell the day before."

Article NY Times – New rule impacts computer funding for schools
7 comments, 17 stars, 3 posts, 52 views
Last posted by An 3 minutes ago Music Counting Crows – Los Angeles
9 comments, 7 stars, 3 posts, 19 listens
Last starred by Alex 4 minutes ago

| | Search 142,071 items | Hello, Doug! | Home | My Profile | My Friends | Groups | Find Friends | Help | Logout |
| chillaxn | Browse Videos | | | | | | | | |

202

| All Content | Videos | Articles & Blogs | Photos | Music | Shopping |
|---|---|---|---|---|---|
| See what other people are checking out: | >My Friends 231 people | My friends and Friends' Friends 15,021 people | | Everyone | |

| My Friends | Alex last Starred 31 minutes ago | Greg last commented 1 hour ago | An last posted 2 hours ago | Liz last starred 4 hours ago | Eric last purchased 5 hours ago | ...and 236 others |

Pages: 1 2 3 4 5 6 7 8 9 10 [Next] [Last]          204

Search for "Buenos Aires hotel":
Results 1-10

Reviews Buenos Aires hotel reviews website
Reviews from users about the quality of hotels all over the city for most any hotel or hostel.
http://www.reviews.com/buenosaires/
512 comments, 5 purchases, 21 stars, 24,931 views
7 connected users with comments, purchases, stars
and/or visits on this webpage: Click here to message them
Last checked by a friend 7 minutes ago

FIGURE 3

SYSTEM FOR TARGETING THIRD PARTY CONTENT TO USERS BASED ON SOCIAL NETWORKS

CROSS-REFERENCE TO RELATED APPLICATIONS

This application is a Continuation application of U.S. application Ser. No. 12/116,687 filed on May 7, 2008, titled SYSTEM FOR TARGETING THIRD PARTY CONTENT TO USERS BASED ON SOCIAL NETWORKS which is incorporated by reference herein in its entirety.

BACKGROUND OF THE INVENTION

This application relates generally to systems for targeting content to Internet users. More specifically, this application relates to systems that utilize social networks to target content to users.

The Internet makes an enormous amount of information available to users. For example, video, audio and text files abound, and users can participate in real time discussions on a whole range of topics. Individual users may find it difficult to find the information that is particularly useful or entertaining to them among the much greater amount of information that is not. Most popular lists may indicate information and sites that are popular with the overall group of Internet users, but may not be well suited for a particular user.

Search engines are useful, but require the user to filter the information, do not readily account for the taste of the user, do not show how the user is connected to a given search result and do not readily let users contact people who have either interacted with or created content inside a webpage. For instance, a user may search for travel information about Argentina on a web search engine and a search engine may require the user to filter through millions of results. Even a specific search such as "Buenos Aires hotels" returns a multitude of perspectives and no easy way to tell what information to trust. Further, the web contains many sources of disparate quality and thoroughness, including user generated content like blogs, user ratings/reviews and user comments. For instance, a user review may contain users discussing life in Buenos Aires, but one point about life in a particular neighborhood may not be detailed enough for a given user and the user wants more information. Websites offer disparate means of contacting users that don't reliably result in getting a satisfactory response so a user can't be sure to get a response after asking a question. Collectively users have a multitude of questions and answers about gaps in information on websites, but there is no ready way to add comments for other users to benefit. Owners and operators of businesses can masquerade as independent reviewers. When forced to trust a recommendation on a webpage, the user may make the wrong decision and have to face the impact without recourse. For instance, a user may choose to travel to a resort for vacation based on a review, but find changing resorts cost prohibitive or not feasible in case the recommended resort does not live up to expectations.

Traditionally, one way people have made decisions is to rely on the advice and experience of others when choosing to consume information, products, or services. In a bricks and mortar world, friends may provide recommendations on books, movies, music, magazines, and other sources of information and entertainment. Additionally, word of mouth recommendations are valuable when selecting goods or services. Word of mouth recommendations are particularly valuable because they come from people a user self identifies with and likely share some of the user's tastes.

Word of mouth recommendations are also very useful in the Internet context. Friends may recommend websites, movies, music, articles or other information that may be of interest to one another. However, such word of mouth recommendations, while valuable, are relatively cumbersome. To provide recommendations, users may send emails, text messages, or make phone calls to one another. Such modes of communication limit the ability for word of mouth recommendations to help target the vast amount of information on the Internet. Generally, the most valuable and useful information comes from within a person's own social network.

Social networks show the interrelation of acquaintances and may classify members by degrees of separation (i.e., the number of connections linking any two individuals in a social network). For example if individual A is connected to individual B through two intermediate acquaintances (C and D) they are connected at three degrees of separation. When two people are connected by N number of intermediate acquaintances, the two are separated by N+1 degrees of separation. Computer implemented social networks, such as those described in U.S. Pat. No. 7,069,308, may be established to link those people who are within a maximum degree of separation (Nmax).

In their daily lives, people routinely operate within their social network to meet new people who exchange information for a variety of reasons such as sharing interests, contact information, education background and favorite quotes. Social networks enable sharing information by displaying a friend's activities about what updates friends have made to their information. For instance, a user may add a new photo or change a music interest to the band "Counting Crows" and another user may see the friend update. As such, social networks are useful for learning about what is happening inside the social network, but not for efficiently learning what is popular with users outside of the social network. Even for users willing to share their activities outside of the social network, there are many activities users simply do not want to share or would have reservations about sharing for privacy reasons. For instance, a user may not want to share that the user visited a webpage for a new movie with which the user would rather not publicly associate. Further, managing privacy for each and every website a user visits would be too time consuming. The privacy concerns are a barrier for users to be willing to share their web activities with others. Still, much of the content a user is interested in learning about or discovering comes from outside of a social network. For instance, a user may want to know that 19 of their friends watched a trailer for a new movie. There is a need for enabling users to share and discover content with other users in their social network without violating users' privacy.

There are several reasons people prefer meeting new people through social networks or relying on their social networks for information: it is more comfortable, it is more efficient, and it is more likely to lead to desirable relationships than other methods. Interacting through social networks is more comfortable than interacting with strangers. This is partly due to the fact that members of a social network may often have shared interests and tastes that effectively allow members to filter based on these traits by working within their social network.

Some methods of disseminating information in a social network have been investigated. For example, those methods and systems disclosed in U.S. Patent Publication No. 2008/0040673 filed by Zuckerberg, et al. relate to method of presenting information about members of a social network to other members of the same social network. This allows for the sharing of information regarding the members of the social network, such as the addition of new content or links created with new contacts, but, among other disparities, does not allow for the efficient sharing of information to members of the social network that is extraneous to the network based social network.

Other methods of providing recommendations to users have been proposed. For example, U.S. Pat. No. 6,853,982 to Smith, et al. discloses a system of recommending products to SYSTEM FOR TARGETING THIRD PARTY CONTENT TO USERS BASED ON SOCIAL NETWORKS Inventor: SHERRETS, Doug a user based upon those products already viewed by the user. Additionally, U.S. Pat. No. 7,113,917 to Jacobi, et al. disclose a method of recommending products to a user based upon the purchases of other users who have purchases in common with the user. However, among other disparities, neither of these methods provide for the advantages of word of mouth recommendations because the methods do not provide for linking users of a social network who are likely to share interests.

Accordingly, there is a need for a system of targeting content to Internet users that provides the benefits of word of mouth recommendations while removing the barriers created by cumbersome communications techniques.

SUMMARY OF THE INVENTION

Some embodiments relate to a method of providing Internet content to a user utilizing social networks. The method comprises providing Internet usage data for a plurality of users, determining which users belong to the same social network, and providing at least one of the users access to Internet usage data for those other users who are in the same social network.

Other embodiments relate to a method for connecting a first registered user to a second registered user through one or more other registered users. The method comprises setting a maximum degree of separation (Nmax) of at least two that is allowed for connecting any two registered users, wherein two registered users who are directly connected are deemed to be separated by one degree of separation and two registered users who are connected through no less than one other registered user are deemed to be separated by two degrees of separation and two registered users who are connected through no less than N other registered users are deemed to be separated by N+1 degrees of separation. The method then includes searching for the user ID of the second registered user in the sets of user IDs that are stored for registered users who are less than Nmax degrees of separation away from the first registered user, and not in the sets of user IDs that are stored for registered users who are greater than or equal to Nmax degrees of separation away from the first registered user, until the user ID of the second registered user is found in one of the searched sets. The first registered user is connected to the second registered user if the user ID of the second registered user is found in one of the searched sets, wherein the method limits the searching of the second registered user in the sets of user IDs that are stored for registered users who are less than Nmax degrees of separation away from the first registered user, such that the first registered user and the second registered user who are separated by more than Nmax degrees of separation are not found and connected. Internet usage data for the first registered user and the second registered user is provided, and the Internet usage data of the first registered user to the second registered user if the first registered user and the second registered user are separated by no more than Nmax degrees of separation.

Yet other embodiments relate to a method for connecting a first registered user to a second registered user through one or more affiliations. Connections can be identified and used even if any given two users have not formed an explicit and confirmed connection. Connections through affiliation can be used, such as being members of the same group, sharing the same listed interests, attending or having attended the same school, being born in or living in the same or similar place, and working or having worked at the same company. A given user is connected to a multitude of connected users.

BRIEF DESCRIPTION OF THE SEVERAL VIEWS OF THE DRAWINGS

FIG. 2 is an exemplary graphical user interface for presentation of Internet usage data to a user.

FIG. 3 is an exemplary graphical user interface for presentation of Internet search results to a user.

DETAILED DESCRIPTION

Figure 1:
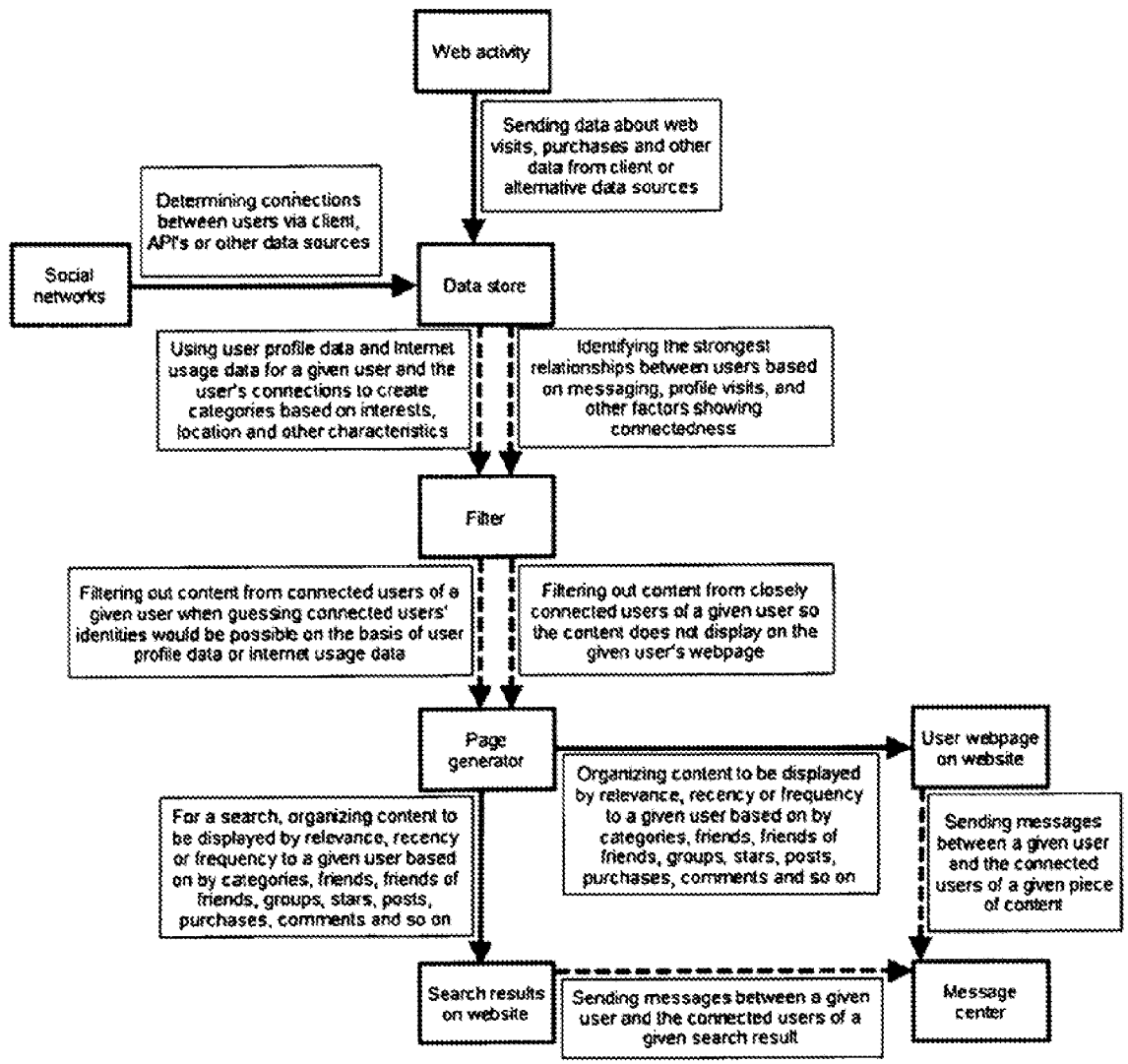
FIG. 1 is flow diagram for some embodiments of the invention.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more components can reside within a process and/or thread of execution, and a module or component can be localized on one computer and/or distributed between two or more computers.

As used herein, the terms "desktop," "PC," "local computer," and the like, refer to computers on which systems (and methods) according to the invention operate. In the illustrated embodiments, these are personal computers, such as portable computers and desktop computers; however, in other embodiments, they may be other types of computing devices (e.g., workstations, mainframes, personal digital assistants or PDAs, music or MP3 players, and the like).

As used herein, the terms "desktop," "PC," "local computer," and the like, refer to computers on which systems (and methods) according to the invention operate. In the illustrated embodiments, these are personal computers, such as portable computers and desktop computers; however, in other embodiments, they may be other types of computing devices (e.g., workstations, mainframes, personal digital assistants or PDAs, music or MP3 players, and the like).

As used herein, the term "Internet usage data" or "data" refer to all data that can be collected via web analytics programs as well as all information about any activity that occurs on the web. Web analytics data includes time on site, click order, page enter/exit, number of visits, browser type, screen resolution, language, location and operating system. Additional activity collected includes products/services put in shopping cart, products/services purchased, prices paid and content viewed or created. Any activity of the user with the web can be included as Internet usage data. As used herein, the term "content" refers to Internet usage data that is displayed on a user webpage.

Overview

A system for targeting content to users based on social networks is disclosed. Some embodiments may include a system comprising a combination of a server with a website interface and a software application, or collection of Internet usage data without requiring a download such as through other data sources (e.g., partner websites sharing data with the system about the users, RSS or RSS-like technologies feeding updates about content or user activities, ISPs sharing usage data, advertising networks sharing user data, etc.). The content may include all content available on the web, which includes webpages, videos, music, documents, and all other audio/visual/text content viewable through a web browser. Information included around the content may also include all the data that is available through web analytics, such as data about how long users spend on the content. Additional data can be included and is described in the definition above for "Internet usage data." The envisioned content also includes all media playable via a media player, such as music files. The term "pages" is used throughout this document to mean not just webpages, but also other content viewable via a web browser or consumable via a media player. A means of targeting is based on displaying content that users in a given user's social network consume/view to the user in the form of links to the content and/or by directly displaying or reproducing all or part of the content itself. The purpose is to enable users to share content about themselves with other users, whether anonymously or non-anonymously. Done anonymously, users can share all their web visit history without worrying about the consequences of tying their name to every single webpage they visit because their name will not be tied to what they do online. Instead, their web activity may be grouped with others' web activity and presented to friends using useful and entertaining filters. The benefit to friends and the community of users is that users are able to discover content thanks to the collective browsing actions of everyone else. For instance, a set of users may visit a movie trailer, causing the trailer to appear on a multitude of user's webpages. When those users check out the trailer, the trailer is spread to more users. As more users view, the trailer spreads to more connected users.

Information tends to spread through networks of people by word-of-mouth, but typically word-of-mouth means users explicitly telling someone about something, such as communicating by sending a link to a friend or via IM or having a conversation about something in person. Our system is designed to enable word-of-mouth to spread much more easily thanks to eliminating the barrier to spreading by automatically causing items that are popular with friends, friends of friends or other filters/groupings of people to be discovered simply because they are popular and being used by those groups of people. This is a more efficient approach because there is so much content on the web that it is necessary to be able to filter through all the useless content, and friends and other trusted groups of people can act as those filters. The system consists of four major components:

- collection of data from users
- creation and importing of users' social networks
- display for users
- integration into third party services and external applications

Collection of Data from Users

Data may be collected from the user in either of two ways: explicitly and/or implicitly.

Explicit data collection means the user manually specifies information about content he or she has viewed/consumed when he wants to share the content. For example, for a webpage, this information would include the URL (and optionally the title) of the page viewed. For a song, this would include the song title and artist name. The user provides this information to the system via the website or other means such as a bookmarklet or browser add-on or extension and it enters the system in this way.

Implicit data collection means the user does not manually specify information about content he or she has viewed; rather, it is collected automatically. This is accomplished via a distributed software application (e.g., an add-on/plug-in/extension for web browsers, or a desktop application, or an integral part of an operating system, or some combination) or without a download. In the case of software, it interfaces with the web browser to determine the URL, title, and source code of any page viewed by the user in the web browser. Alternatively, the software can interface with data produced by the web browser that represents this data (for example, the browser cache, or the interfaces made available to browser add-ons and extensions). Thus, whenever the user visits a webpage, the URL and title of this page (along with additional info related to the page) is sent to the server, with an identifying code uniquely tying the visit to the user. Interpretation of the URL and/or title and/or source code can be undertaken by the software prior to the transfer of the visit to the server (this can also be accomplished without the software by having partners pass back data or crawling the pages ourselves). For example, thumbnail image URLs may be extracted from the source code, or the cache may be accessed directly for image files and these may be transferred to the server along with the page visit information. In addition to filtering how and if data is sent based on the URL and/or title and/or source code of a webpage, the software can also filter how and if data is sent based on the time the user spends on a given webpage. For example, it can only send visits for pages that the user had open for at least a specified period of time (this can also be applied for using data collection from sources not requiring a download). The software can also interface with media players to determine the song title, artist, album, genre, and other data associated with media consumed by the user. The software need not have a graphical user interface, and can indeed be completely invisible to the user. The software may also allow the user to explicitly add Internet usage data to the system as described above. In the case of not requiring software, the Internet usage data could be collected about users through partners that identify our users by comparing our cookie to theirs and in that case start sharing with the system. Internet usage data can be shared in a multitude of ways by partners, including third-party websites and ISPs. Regardless of how the content is aggregated, the usefulness and entertainment value comes in displaying it across friends, other filters like friends of friends and groups, or other connected users.

Creation and Importing of Users' Social Networks

The system allows for both the creation of and the importing of a given user's social network(s). A user may be a member of more than a single social network, and these networks can be tracked separately and/or together. Note that the term "friends" is used here to simply mean people who are within 1 degree of separation from the user, and "friends' friends" or "friends of friends" are people within 2 degrees of separation.

For creating a social network, the user may invite friends via email or via the website. This enables him to specify who his friends are. The user may also join a group on the server via the website, which will cause the user to also become part of a special social network consisting of group members. Email invitations involve triggering an email to be sent to a recipient containing a link, which is accessed by the recipient to confirm or reject the invitation request.

For importing a social network, there are three primary options. The user may enter his login credentials (e.g., username and password or other credentials) in the software or website and the software or server will log into one or more third party servers on behalf of the user and download the unique identifiers (e.g., userid, username, etc.) of the user's social network (e.g., his friends, potentially his friends' friends, etc.). These unique identifiers are then used to keep track of who the user's friends are on third party services. Alternatively, a user's social network may be "passively" imported by using a download/plug-in or alternative way that passively monitors a social network site. As a user navigates a social network, the data about the ID's of the user's friends can be pulled and saved, thereby creating a map of the friend connections of the user while not creating any additional server load. Thirdly, the user may enter their login credentials as part of an API provided by a social network that enables the user to authenticate themselves to the social network then permit the system to display the connections between friends of that user.

Display for Users

Data may be displayed back to the user via the software and/or via website. The preferred embodiment is via the website. The user is presented with URLs, titles, and/or content (e.g., thumbnail images, source code snippets, etc.) of pages visited by other users of the system together which represent an item. The user may filter items to show only items from users he is friends with (1 degree of separation away), from his friends and their friends (2 degrees of separation), and so forth (3 degrees, etc.). The user may also filter this content to only show items from users in the same groups as him, on a group-by-group basis, or for all groups he is a member of at once. The items displayed do not specifically list a friend or a person tied to the items, meaning it is displayed anonymously in order to protect the privacy of the users. If a user wants, the system may permit them to share their user activity non-anonymously, in which case all of the items they are associated with would include the user's name. The system may also provide privacy options for the user to specifically list websites they are ok with publicly affiliating their name with so as to enable the user to avoid linking their name to content they might find embarrassing if their name was connected to the content. The primary intent of this service is to be anonymous so as to enable users to share as much information about what they're doing without any of that content being tied to that user. One solution is to be primarily anonymous, and in case of users who actually want their name tied to particular websites they visit and actions they take there, then the user may select those websites, thus providing all the usefulness and entertainment that goes with sharing content anonymously to friends to enable them to discover new items, while providing an option for users to in select instances tie their names to items so their friends know there is a connection.

Users may also interact with items on the site. For example, they may vote for or star items or leave a comment, which means a vote or star record is incremented or comment text is added for that user for that item. A user may conduct any combination of these actions.

In addition to being able to be filtered based on social networks of friends and groups, content may be displayed based on time (reverse chronologically or chronologically), by most visited, by random (no particular order), and according to an algorithm (what's most relevant). If it is displayed based on time, the elapsed time since being viewed may be displayed to the user, or a timestamp may be displayed, or no indication of time at all may be displayed. Likewise, the number of votes, comments, and stars may be indicated.

Furthermore, items may be automatically categorized as belonging to a particular content category (e.g., Videos, Shopping, Articles & Blogs, Search, Music, etc.) either server-side or client-side. Server-side, matching of URLs and/or titles and/or page source code to pattern definitions (e.g., regular expressions) may be used to categorize pages, and a flag for media items may be sent from the client such that the server knows that the item is a music, video, etc. item. Categorization includes identifying content from a particular website and pulling in identifying information such as an icon indicating the website. Client-side, the same process may also be used. Categories are not limited to those listed above and are not necessarily simply types of content. Rather, categories can include other types of divisions, such as a category for personalized content for a given user. User profile data and Internet usage data for a given user and the user's connections to create categories based on interests, location and other characteristics. For instance, a category can be created based on a user's interest in photo editing, so the content displayed would come from connected users sharing an interest in photo editing. A unified category can be created based on what content is most relevant to a given user across all categories. Aside from regular expression pattern matching and other basic forms of pattern matching, artificial intelligence/neural network/fuzzy logic/other algorithms may be used to process the data returned explicitly or implicitly by users to the system in order to categorize items. The system may also access external data sources to better classify data, for example, looking up the song artist and song title of a song item to determine the genre if it is not provided by users implicitly or explicitly.

The categories are there as an option for users to decide what type of content they want to zero in on, but the user also has the option to see all the categories of content together with filtering down to what's most relevant. One purpose of the categories is to provide a limiting feature to filter out content that would be objectionable, such as adult content. The system is designed to be automated to the extent user input is not required in order to filter out all the objectionable material and leave only content from websites that are of high quality. The Video category would include video websites to see what users are viewing. The Shopping category would include shopping websites to see what products users are checking out and what they are actually buying. The Search category would include search engines to see what users are searching. Items can be presented according to what is most popular in the filters. For instance, among friends of friends, an item for "portable music player" might be displayed and say "6 of your friends of friends have bought a portable music player." The brand name, make and model information can be included. Information about how recent those purchases occurred, such as "3 of your friends have bought a North Face fleece in the last month," can also be included.

Items may also be presented that are "interesting" to a user. For example, if a user stars content that other users have starred, but have not starred content that those other viewers have also starred, that other content can be presented to the original user as "interesting". This applies to votes in place of stars, comments in place of stars, and views/hits in place of stars. This can also include letting a given user vote content up or down depending on whether the user likes the content or not. In selecting the other content that has not been viewed yet by the original user, the system can also opt to filter the content further based on the number of stars and/or comments and/or votes and/or views/hits that the item has received across the system (for example, within the user's social network or system-wide). The idea is to enable users to discover content that people like them have said they enjoyed. The system can filter content in a multitude of ways using algorithms and models to determine what content the user may find most interesting, such as displaying content based on demonstrated interest of the user or other shared characteristics of connected users. The system can filter content based on the Internet usage data and user profile data of a given user and the user's social network. The system can look at the listed interests of a user and the user's social network to identify the most relevant interests, then display content to the user related to the identified interests. For instance, a user may list skiing as an interest and the user's social network lists other related terms like snow, Vail, ski lifts and winter vacations. As a result, the system can present content related to those topics based on the Internet usage data of the user and the user's social network that lists terms related to skiing. Further, the Internet usage data of all users who list similar interests can be used to influence what content is displayed, whether the content is directly related to the interest or not. Users that list terms like skiing and Vail may tend to check out business websites or articles about investment news, so content may be presented related to those topics to a user who lists skiing as an interest.

Algorithms may also be used to determine what items should be displayed to the user in order to avoid privacy problems such as good friends identifying another good friend based on the content that friend viewed. For instance, a good friend might know another good friend loves cooking a certain specialty dish. If the system were to display websites and web searches for content related to that specialty dish, then the friend seeing the anonymous actions might easily draw the connection to their friend. This likelihood would be magnified if the system showed more anonymous items to good friends than to less than good friends because the items displayed would be predominantly from the same handful of people. The solution is to identify which users are good friends and then specifically limit or bar the display of items from one good friend to another good friend. "Good friends" can be determined by looking at the number of times they visit each other's profiles, how often they email/im/message each other and other indicators of connectedness. Further, content shown might be able to be linked to a user based on the user's exposed Internet usage data or the user's user profile data. For instance, a user may see content that says two connected users have bought tickets to see an obscure local band. The user may only have two friends in the locality of that band or two friends may list the band as their favorite on their profile. The solution is to automatically filter out content when a connection can be drawn between content and a given user by considering the Internet usage data and user profile data for the user, the user's social network and all other users.

With scale, most if not all of the actions of our users will be stored in our system and displayed anonymously (or non-anonymously if a given user chooses to do so for particular websites) for friends, friends of friends and other filters described above. But there is too much content for all users to view all the content. That is why filters based on the frequency of visits of a particular website, how long they visited, over what period of time, how it compares to what you would expect given past activity and other factors are all important factors in figuring which items should be displayed to any one user. The system may provide flexibility to the user in how they want their content displayed. A variety of different viewing options of all the items for any given user includes: providing one view where the user can see items the system determines are most relevant and potentially interesting to them based on our algorithms, including a filter to filter out content that their good friends have visited and to filter out content where a connection can be drawn to a user based on their Internet usage data or their user profile data such as their listed interests; the system may also provide another view to filter to specific content categories (e.g., videos, shopping, search, etc.); the system may also provide another view to filter and sort content categories based on the Internet usage data and user profile data of the user and the user's social network; the system may also provide another view to see what is most popular among different filters (e.g., filters like friends, friends of friends, groups, etc.); and the system may provide yet another view based on explicit user feedback for what's best (e.g., users giving a star rating or voting up/down content based on what they think).

Another embodiment includes a web search feature. In one embodiment, users can see what content was viewed by connected users. Internet usage data can be searched so a user can identify content that was viewed by connected users. Information can be provided on search results to indicate that connected users visited, purchased or created content on a given search result webpage. A user can see multiple connected users have visited a particular webpage. For instance, a given user may see that 27 connected users have visited a reviews webpage about a restaurant. The user can send a message to the 27 connected users to ask whether the restaurant is as good as the reviews state, to seek clarification about incomplete reviews or simply to communicate. The message center targets messages to connected users most likely to respond (e.g., closest connected friends, users who respond to messages most often, users who respond to particular topic area questions most, webmasters of the website, other people who created content on that page, etc.). The message can either be delivered anonymously, meaning the sender's name is not identified, or non-anonymously, meaning the sender's name is identified. Messages can be throttled to control message overflow, meaning messages are sent out and messages keep being sent out to more connected users until either a response is received or there are no more connected users to contact. Message delivery can occur through any communication channel, on the web and mobile, including email, text and delivery via RSS or other notification services. Messages can be used to fill in the gaps in knowledge found in search results for the benefit of other users. Some users can seek clarification about incomplete reviews and get answers which can be viewable to other users. Over time, search becomes more useful because missing content is filled in and incomplete explanations are made clearer. For instance, a user may search for a new electronics device and read reviews but seek clarification about the extent of particular technical capabilities of the device. The user may get answers from connected users. The answers may be recorded as comments for the webpage and be viewable to other users. Another user may view the same webpage and have the same question, and may find the comment answers the question. With more answers, the answers can be organized in a way that is useful and scalable so viewing comments and answers is easy. Search results can be influenced based on webpages visited by connected users by using Internet usage data and other data collected to determine which results are most relevant. The data presented in search results and rankings can be displayed on any third-party website, search engine or any other delivery service.

Integration into Third Party Services and External Applications

Content that the user produces is syndicated via parsable standardized file format (e.g., XML, RSS, Atom, JSON, etc.). For example, a list of links the user's friends and their friends are checking out (and/or have starred, commented, voted), as well as the comments and stars and votes of the user Links that a user's friends and their friends are checking out (and/or have starred, commented, voted), as well as those of his own can also be delivered via email, IM, and other similar communications means Referring to FIG. 1, the system includes a data store receiving web activity or Internet usage data and account information for social networks. The data may be entered manually by a user or the system may query third parties such as social networking sites to obtain the data automatically as discussed above. A processor connected to the data store identifies relationships and the associated web activity data that may be relevant to the user. The determinations of which members of a social network will have relevant web activity data may be made using messaging, profile visits, or other factors. A filter is used to protect the anonymity of the users whose web activity data is used. The filter may remove data from those users who are considered to be very good friends that might be identifiable by their web activity data. Even if users are not good friends or even closely connected, a filter may also remove data from those users who could still be identified based on drawing a connection between the content shown and the user's unique Internet usage data or user profile data. After the filter has been used to further anonymize the data, the web activity data is passed to a page generator. The page generator formats and presents the web activity data to the user in a way that is useful and relevant. The user may sort the data by user views, user comments, user activities such as purchases, user ratings, time, type of site, type of content, or other category to further customize the presentation. Categories can include content generated for a given user based on the Internet usage data or user profile data of the user's friends, friends of friends, groups and other connected users.

From the home page, a user may perform a web search. The results may be scored both by the keywords, but also by the relevance of the pages found to other users' Internet activity data. In this way, hits that have been viewed or otherwise accessed by friends of a user may be ranked higher than they may have been based only on the appearance of keywords. A message center may also be provided. The message center may be used by users to communicate regarding a given piece of content or search result. The communications may be made anonymous and appear as comments.

Referring to FIG. 2, an exemplary graphical user interface 100 may include objects that contain lists of links that may be sorted by type of file presented at the linked site, the type of site (i.e., video, shopping, photos, articles, etc.), user visits, user comments, user activities such as purchases and by ratings given by other users. As shown, field 102 and 104 may be used to present the links In field 102, the most recently visited links are shown for each category of link (i.e., video, shopping, photos, articles, etc.). Field 104 presents a list of links for the same categories but with the most recently commented on or rated links Tabs 102 may be provided across the page. The tabs may link to pages that contain the same or different links that have been selected by the system but are sorted differently. For example, the "Videos" tab may link to a page listing only video links that are sorted by user activities, user visits or user ratings (i.e., with the most popular links first). The user may then sort by other filters such as chronologically (i.e., with the most recently added link presented at the top of the page) or alphabetically by title or website. A listing 104 of recent activity by the user's friends may also be presented. The listing may include recent postings, comments, purchases or other events by members of the user's social network. The names of the friends may be presented as links (i.e., hotlinked text) that point to the friend's user profile on the system or at another site. Alternatively, the friend's name may be linked to any non-anonymous entries provided by the friend.

Referring to FIG. 3, an exemplary graphical user interface 200 may display search results and include objects that contain lists of links that may be sorted by type of file presented at the linked site, the type of site (i.e., news, shopping, etc.), or by ratings given by other users. The links are tied to webpages that generate hits based on a keyword search performed by the user. The results may be rated both by relevance to the keywords, and by the presence of the pages in the web activity data of other users. Tabs 202 may be provided across the page. The tabs may link to pages that contain the same or different links that have been selected by the system but are sorted differently. For example, the "Videos" tab may link to a page listing only video links that are sorted by user visits, user comments, user activities such as purchases and user rating (i.e., with the most popular links first). The user may then sort by other filters such as chronologically (i.e., with the most recently added link presented at the top of the page) or alphabetically by title or website. A listing 204 of recent activity by the user's friends may also be presented. The listing may include recent postings, comments, purchases or other events by members of the user's social network. The listings may relate to those pages relevant to the keyword search. The names of the friends may be presented as links (i.e., hotlinked text) that point to the friend's user profile on the system or at another site. Alternatively, the friend's name may be linked to any non-anonymous entries provided by the friend.

Some embodiments relate to a method of providing Internet content to a user utilizing social networks, the method comprising providing Internet usage data for a plurality of users, determining which users belong to the same social network, and providing at least one of the users access to Internet usage data for those other users who are in the same social network.

Optionally, the step of providing Internet usage data includes automatic recording and reporting of websites visited by the plurality of users. In some embodiments, the step of determining which users belong to the same social network comprises, querying social networking websites to which the users belong to obtain lists of social network members.

In some embodiments, the step of providing at least one of the users access to Internet usage data comprises, presenting a set of links that are sorted by the type of file to which the links point. Additionally, the step of providing at least one of the users access to Internet usage data may comprise, presenting a set of links that are sorted by the category of content to which the links point.

The set of links that may optionally be sorted chronologically or reverse chronologically. The set of links may be sorted by user rating. The set of links that are determined to be relevant based on the user's Internet usage data or the user's and the user's social networks user profile data. Additionally, the set of links may be presented based on implicit connections to other users, such as affiliations, groups, interests, user profile data and Internet usage data. The step of providing at least one of the users access to Internet usage data may comprise, presenting a set of links anonymously without displaying the user's name or information. Alternatively, step of providing at least one of the users access to Internet usage data comprises, presenting a set of links with displaying some or all of the user's name or information or the links may be organized by the purchases of the users.

In some embodiments, the step of providing at least one of the users access to Internet usage data comprises, presenting a set of links organized in any way that Internet usage data or user profile data can be sorted. A set of links may be presented based on implicit connections to other users, such as affiliations, groups, interests, user profile data and Internet usage data. The set of links may be sorted into categories based on interests, location and other characteristics by using Internet usage data for a given user and the user's connections or any characteristic from using user profile data for a given user and the user's connections In some embodiments, the step of providing at least one of the users access to Internet usage data comprises, enabling users to send messages to users anonymously based on their Internet usage data. Users may be enabled to send messages to users non-anonymously based on their Internet usage data. Messages sent by users to other users may be prioritized based on the likelihood of user response. The likelihood of user response is made into a metric based on factors that include response time to past messages, how the user receiving the message is connected to the user sending the message, message topic, message topics that garnered a response in the past, number of messages the recipient has received or sent, number of messages the sender has received/sent, and Internet usage data of possible recipients to identify users with topic area interest or expertise.

In yet other embodiments, the step of providing at least one of the users access to Internet usage data comprises, presenting a set of links in response to a keyword search that are determined to be relevant based on the user's Internet usage data (including aggregate user visits, user comments, user activities such as purchases and user ratings) or the user's and the user's social networks user profile data. A set of links may be presented in response to a keyword search that is organized in any way that Internet usage data or user profile data can be sorted. Aggregated Internet usage data of a user or a user's connections may be presented next to search results. Optionally, non-anonymous Internet usage data of a user or a user's connections may be presented next to search results.

In some embodiments, the step of providing at least one of the users access to Internet usage data comprises, presenting aggregated product and service purchase information of a user or a user's connections next to search results. Optionally, product and service purchase information of a user or a user's connections may be presented non-anonymously next to search results.

In some embodiments, the step of providing at least one of the users access to Internet usage data comprises, presenting user comments for any given link organized according to how a user is connected to the users providing the comments. Optionally, the Internet usage data of one close friend may be filtered such that the data is not presented to another close friend. Additionally, the Internet usage data may be filtered such that data of a user that can be connected to the user based on exposed Internet usage data or user profile data is not presented.

In some embodiments, a computer system includes a server computer and a database of registered users that stores for each registered user, a user ID of the registered user and a set of user IDs of registered users who are directly connected to the registered user, a method for connecting a first registered user to a second registered user through one or more other registered users, the method comprising the step of setting a maximum degree of separation (Nmax) of at least two that is allowed for connecting any two registered users, wherein two registered users who are directly connected are deemed to be separated by one degree of separation and two registered users who are connected through no less than one other registered user are deemed to be separated by two degrees of separation and two registered users who are connected through no less than N other registered users are deemed to be separated by N+1 degrees of separation. The method further includes searching for the user ID of the second registered user in the sets of user IDs that are stored for registered users who are less than Nmax degrees of separation away from the first registered user, and not in the sets of user IDs that are stored for registered users who are greater than or equal to Nmax degrees of separation away from the first registered user, until the user ID of the second registered user is found in one of the searched sets, and connecting the first registered user to the second registered user if the user ID of the second registered user is found in one of the searched sets, wherein the method limits the searching of the second registered user in the sets of user IDs that are stored for registered users who are less than Nmax degrees of separation away from the first registered user, such that the first registered user and the second registered user who are separated by more than Nmax degrees of separation are not found and connected. Internet usage data for the first registered user and the second registered user is provided, and Internet usage data of the first registered user is provided to the second registered user if the first registered user and the second registered user are separated by mo more than Nmax degrees of separation.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims.

What is claimed is:

1. A method of automatically providing Internet content for and communicating with a user, the method comprising:
   providing Internet usage data for a plurality of users;
   determining which users share at least one connection;
   providing at least one of the users access to Internet usage data for those other users who share at least one connection;
   enabling at least one user and/or system to share communications regarding Internet content with at least one other user based on their Internet usage data; and
   wherein any Internet usage data and/or factor for likelihood of recipient interest is weighted by the strength of the connection.

2. The method of claim 1, further comprising determining the likelihood of recipient interest.

3. The method of claim 1, wherein the likelihood of user interest is at least partially based on the Internet usage data for a user and/or for other users sharing at least one connection with the user.

4. The method of claim 1, further comprising prioritizing, organizing, and/or filtering communications and/or content shared by the at least one user and/or system to the other user based on the likelihood of recipient interest.

5. The method of claim 1, wherein the step of providing Internet usage data includes automatic recording and reporting of websites visited by the plurality of users.

6. The method of claim 1, further comprising presenting content and/or communications that is organized in any way that Internet usage data and/or user profile data can be sorted, prioritized, organized, and/or filtered.

7. The method of claim 6, wherein presenting the content and/or communications that are sorted, prioritized, organized, and/or filtered in at least one of the following ways:
   strength of connection;
   how a user is connected to the users;
   likelihood of user and/or recipient interest;
   number of visits to a particular webpage by a user and/or other users who share at least one connection;
   interests;
   type of file to which the links point;
   the content of the file;
   the category to which the file belongs;
   chronologically;
   reverse chronologically;
   user views;
   user comments;
   user activities;
   purchases;
   votes; or
   ratings.

8. The method of claim 1, wherein the content is further automatically filtered at least in part based on the self-defined interests and/or interests identified based on Internet usage data of a user and/or the user's connections.

9. The method of claim 1, wherein the Internet content, Internet usage data, usage data, data, and content include at least one of the following:
   web content;
   web analytics data;
   web activity; in any way that internet usage data user activity;
   time on site and/or time spent;
   click order;
   page enter/exit;
   number of visits;
   browser type;
   screen resolution;
   language;
   location;
   operating system;
   products/services put in shopping cart;
   products/services purchased;
   prices paid;
   content viewed and/or created;
   other data sources;
   user activities feeds;
   user data;
   interests;
   data shared by partner websites with the system about the users;
   ISPs sharing usage data;
   user data shared by advertising networks;
   webpages;
   videos;
   music;
   documents;
   audio;
   text;
   music; or
   media.

10. The method of claim 1, wherein providing at least one of the users access to Internet usage data for those other users who share at least one connection includes presenting the Internet usage data on a third-party website.

11. The method of claim 10, wherein presenting aggregated Internet usage data on a third-party website.

12. The method of claim 10, wherein information can be provided on third-party websites to indicate that users who share at least one connection visited, purchased, and/or created content on a given webpage.

13. The method of claim 1, wherein the likelihood of recipient interest is determined based on factors including at least one of the following:
   response time to past communications;
   how the user receiving the communication is connected to the user sharing the communication;
   a communication topic, or one or more communication topics that garnered a response in the past;
   a number of communications the recipient has received and/or shared;
   a number of communications the user and/or system sharing has received and/or shared;
   Internet usage data of a user and/or possible recipients to identify users with topic area interest and/or expertise;
   the identity of a webmaster of a website on which the Internet content is available;
   the identity of a person who created the Internet content;
   the identity of a person who created other content on the same webpage and/or website on which the Internet content is available;
   the strength of the connection;
   interests;
   social network user profiles;
   social network user profile data of other users;
   a number of user comments, user activities, user votes, and/or user ratings;
   a number of visits to a particular webpage by a user and/or other users who share at least one connection; or
   at least one piece of Internet usage data.

14. The method of claim 1, wherein presenting user communications comprises prioritizing, organizing, and/or filtering the presented communications according to how a user is connected to the users providing the communications.

15. The method of claim 1, wherein presenting a set of links based on connections to other users, determined by affiliations, groups, interests, user profile data, and/or Internet usage data of the user and/or the user's connections.

16. The method of claim 1, wherein the step of determining which users share at least one connection comprises querying social networking websites to which the users belong, to obtain lists of social network members.

17. The method of claim 1, wherein the at least one connection is based on mutual membership in the same social network.

18. The method of claim 1, wherein the at least one connection is based on which users have connections by affiliations even if any given two users have not formed an explicit and confirmed connection.

19. The method of claim 1, wherein the at least one connection is based on shared user information.

20. The method of claim 19, wherein the shared user information includes at least one of the following:
   group membership;
   hometown;
   interests;
   school attended;
   workplace;
   current home location;
   living in the same or similar place;
   location;
   affiliations;
   communications;
   user profile data;
   social network data;
   webpages visited;
   content viewed and/or created;
   friends; or
   friends of friends.

21. The method of claim 19, wherein shared user information includes information about a user and/or the user's connections.

22. The method of claim 1, wherein the strength of the connection between two users is determined by at least one of the following:
   a degree of separation of the users in a social network;
   a number of visits by one user to the other user's profile;
   a number of communications shared from one user to the other user;
   a number of responses from one user based on communications from the other user;
   a number of connections existing between the users;
   a number of similar interests between the users; or
   a number of visits to a particular webpage by a user and/or other users who share at least one connection.

23. The method of claim 13, wherein determining the likelihood of user response and/or strength of the connection includes calculating a metric.

24. The method of claim 1, wherein the communication is comprised of at least one of the following:
   an e-mail;
   a text message;
   a hyperlink to the Internet content;
   a message shared via an RSS feed;
   a notification shared via an automated notification service;
   an embedded object in a webpage including at lease a portion of the Internet content;
   a message;
   an instant message;
   a question;
   an answer;
   a comment;
   a post;
   an event;
   an image; or
   content viewed and/or created.

25. The method of claim 1, wherein communications between users and/or answers may be recorded and be viewable to other users such as on a webpage.

26. The method of claim 1, wherein the communications between users is prioritized, organized, and/or filtered in a way that is useful and scalable so viewing communications, comments, and/or answers is easy.

27. The method of claim 1, wherein the content and/or communication is shared without a request from the recipient.

28. The method of claim 1, wherein the content and/or communication is shared anonymously.

29. The method of claim 1, wherein the step of providing at least one of the users access to Internet usage data comprises, presenting a set of links based on aggregate numbers, including prioritizing, organizing, and/or filtering by one or more of user purchases, user views, user comments, user activities, user votes, and/or user ratings.

30. The method of claim 1, wherein the communication is shared non-anonymously.

31. The method of claim 1, wherein the communication is throttled.

32. The method of claim 31, wherein the communication is shared with users who share at least one connection until a response to the communication is received.

33. The method of claim 31, wherein the communication is shared until all users who share at least one connection have received the communication.

34. The method of claim 1, wherein the communication shared from one user to another user is accessible to other users who share at least one connection.

35. The method of claim 34, wherein the communication shared from one user to another user is searchable by other users who share at least one connection.

36. The method of claim 1, wherein at least a portion of the communications that would be normally shared are not shared based on privacy settings selected by a user and/or system.

37. The method of claim 1 further comprising, filtering the Internet usage data such that data of a user that can be connected to the user based on Internet usage data and/or user profile data is not presented.

38. The method of claim 37, wherein at least one factor used in filtering the Internet usage data is selected from the group consisting of the following:
- response time to past communications;
- how the user receiving the communication is connected to the user sharing the communication;
- a communication topic, or one or more communication topics that garnered a response in the past;
- a number of communications the recipient has received and/or shared;
- a number of communications the user and/or system sharing has received and/or shared;
- Internet usage data of a user and/or possible recipients to identify users with topic area interest and/or expertise;
- the identity of a webmaster of a website on which the Internet content is available;
- the identity of a person who created the Internet content;
- the identity of a person who created other content on the same webpage and/or website on which the Internet content is available;
- the strength of the connection;
- interests;
- social network user profiles;
- social network user profile data of other users;
- a number of user comments, user activities, user votes, and/or user ratings;
- a number of visits to a particular webpage by a user and/or other users who share at least one connection;
- at least one piece of Internet usage data;
- a degree of separation of the users in a social network;
- a number of visits by one user to the other user's profile;
- a number of communications shared from one user to the other user;
- a number of responses from one user based on communications from the other user;
- a number of connections existing between the users;
- a number of similar interests between the users;
- how a user is connected to the users; or
- likelihood of user and/or recipient interest.

39. The method of claim 1, further comprising filtering the Internet usage data such that objectionable content does not appear.

40. The method of claim 1, further comprising filtering the Internet usage data such that data of one close friend is not presented to another close friend.

41. The method of claim 1, further comprising providing Internet search results to at least one of the users based on user input.

42. The method of claim 41, further comprising ranking, prioritizing, organizing, and/or filtering the Internet search results based on the likelihood of user interest.

43. The method of claim 1, wherein the likelihood of user interest is at least partially based on the Internet usage data for a user and/or for other users sharing at least one connection with the user.

44. The method of claim 41, wherein presenting aggregated Internet usage data of a user and/or a user's connections in at least one of the following places:
- search results page;
- next to search results;
- third-party website; or
- search engine.

45. The method of claim 41, wherein search results can be influenced based on webpages visited by users who share at least one connection by using Internet usage data and other data collected to determine which results are most relevant.

46. The method of claim 45, wherein the likelihood of user interest in the search results is determined based on factors including at least one of the following:
- response time to past communications,
- how the user receiving the communication is connected to the user sharing the communication,
- a communication topic, or one or more communication topics that garnered a response in the past,
- a number of communications the recipient has received and/or shared,
- a number of communications the user and/or system sharing has received and/or shared,
- Internet usage data of a user and/or possible recipients to identify users with topic area interest and/or expertise;
- the identity of a webmaster of a website on which the Internet content is available;
- the identity of a person who created the Internet content;
- the identity of a person who created other content on the same webpage and/or website on which the Internet content is available;
- the strength of the connection;
- interests;
- social network user profiles;
- social network user profile data of other users;
- a number of user comments, user activities, user votes, and/or user ratings;
- a number of visits to a particular webpage by a user and/or other users who share at least one connection; or
- at least one piece of Internet usage data.

47. The method of claim 41, wherein presenting a set of links in search results that are sorted, organized, and/or filtered in at least one of the following ways:
- strength of connection;
- how a user is connected to the users;
- likelihood of user and/or recipient interest;
- number of visits to a particular webpage by a user and/or other users who share at least one connection;
- interests;
- type of file to which the links point;
- the content of the file;
- the category to which the file belongs;
- chronologically;
- reverse chronologically;
- user views;
- user comments;
- user activities;

purchases;
votes; or
ratings.

48. A method of automatically providing Internet content for and communicating with a user, the method comprising:
providing Internet usage data for a plurality of users;
determining which users share at least one connection;
providing at least one of the users access to Internet usage data for those other users who share at least one connection;
enabling at least one user and/or system to share communications regarding Internet content with at least one other user based on their Internet usage data; and
providing Internet search results to at least one of the users based on user input;
search results can be influenced based on webpages visited by users who share at least one connection by using Internet usage data and other data collected to determine which results are most relevant;
wherein the likelihood of user interest is at least partially based on the number of visits to a particular search result by a user and/or other users who share at least one connection and the number of visits by another connected user is weighted according to the strength of the connection; and
wherein the likelihood of user interest in the search results is determined based on factors including at least one of the following:
response time to past communications,
how the user receiving the communication is connected to the user sharing the communication,
a communication topic, or one or more communication topics that garnered a response in the past,
a number of communications the recipient has received and/or shared,
a number of communications the user and/or system sharing has received and/or shared,
Internet usage data of a user and/or possible recipients to identify users with topic area interest and/or expertise;
the identity of a webmaster of a website on which the Internet content is available;
the identity of a person who created the Internet content;
the identity of a person who created other content on the same webpage and/or website on which the Internet content is available;
the strength of the connection;
interests;
social network user profiles;
social network user profile data of other users;
a number of user comments, user activities, user votes, and/or user ratings;
a number of visits to a particular webpage by a user and/or other users who share at least one connection; or
at least one piece of Internet usage data.

49. The method of claim 48, further comprising filtering the Internet usage data such that objectionable content does not appear.

50. The method of claim 48, further comprising filtering the Internet usage data such that data of one close friend is not presented to another close friend.

51. The method of claim 48, further comprising ranking, prioritizing, organizing, and/or filtering the Internet search results based on the likelihood of user interest.

52. The method of claim 48, wherein the likelihood of user interest is at least partially based on the Internet usage data for a user and/or for other users sharing at least one connection with the user.

53. The method of claim 48, wherein presenting aggregated Internet usage data of a user and/or a user's connections in at least one of the following places:
search results page;
next to search results;
third-party website; or
search engine.

* * * * *